(12) United States Patent       (10) Patent No.:     US 12,619,692 B2
Shi                                   (45) Date of Patent:         May 5, 2026

(54) PERSONAL DIGITAL IDENTITY MANAGEMENT SYSTEM AND METHOD

(71) Applicant: Xinyu Shi, Weihai (CN)

(72) Inventor: Xinyu Shi, Weihai (CN)

( * ) Notice:   Subject to any disclaimer, the term of this patent is extended or adjusted under 35 U.S.C. 154(b) by 131 days.

(21) Appl. No.:  18/562,200

(22) PCT Filed:  May 13, 2022

(86) PCT No.:    PCT/CN2022/092777
§ 371 (c)(1),
(2) Date:       Nov. 17, 2023

(87) PCT Pub. No.: WO2022/242572
PCT Pub. Date: Nov. 24, 2022

(65)             Prior Publication Data
US 2024/0243922 A1       Jul. 18, 2024

(30)        Foreign Application Priority Data
May 17, 2021    (CN) .......................... 202110535192.6

(51) Int. Cl.
*G06F 21/31*         (2013.01)
*H04L 9/40*          (2022.01)
(52) U.S. Cl.
CPC ............ *G06F 21/31* (2013.01); *H04L 63/083* (2013.01)
(58) Field of Classification Search
None
See application file for complete search history.

(56)             References Cited
                 U.S. PATENT DOCUMENTS

| | | | |
|---|---|---|---|
| 10,715,514 B1 * | 7/2020 | Threlkeld | ........... H04L 63/0807 |
| 2003/0179885 A1 * | 9/2003 | Gentry | .................. H04L 9/0847 |
| | | | 380/277 |
| 2005/0154873 A1 * | 7/2005 | Cam-Winget | ...... H04L 63/0435 |
| | | | 713/150 |

(Continued)

FOREIGN PATENT DOCUMENTS

| | | |
|---|---|---|
| CN | 101166088 A | 4/2008 |
| CN | 102571326 A | 7/2012 |

(Continued)

OTHER PUBLICATIONS

International Search Report and Written Opinion from counterpart International Patent Application No. PCT/CN2022/092777.

*Primary Examiner* — Benjamin E Lanier
(74) *Attorney, Agent, or Firm* — K&L Gates LLP

(57)             ABSTRACT

The present disclosure provides a personal identity management system and method. The method includes a client and a service end. The client uses a user-specified keyword to perform hierarchical management on keys, and the service end accepts the digital identity information from the client and performs digital signature and further displays the information in public. In the method of the present disclosure, available digital identities can be generated securely and quickly with an unlimited quantity, such that the user can perform switching between multiple digital identities so as to achieve the effect of combating the tracking for the digital identities and protecting the user privacy better. Furthermore, in a scenario where identity verification and access control are required, verification can be completed by providing public key and signature.

17 Claims, 3 Drawing Sheets

---

Step 1: initialize-create keys

Step 2: generate a digital identity

Step 3: use a digital identity

(56)        References Cited

U.S. PATENT DOCUMENTS

2008/0178271 A1 * 7/2008 Gajala .................. H04L 9/3213
                                                               726/6
2013/0322621 A1    12/2013 Yoon
2021/0056227 A1 *  2/2021 Xu ......................... G06F 21/64
2021/0136047 A1 *  5/2021 Wilson ................. H04L 9/0861

FOREIGN PATENT DOCUMENTS

| CN | 103297230 | A | * | 9/2013 | |
|----|-----------|---|---|--------|---|
| CN | 103415011 | A |   | 11/2013 | |
| CN | 109347858 | A |   | 2/2019 | |
| CN | 112532387 | A |   | 3/2021 | |
| CN | 108229962 | B | * | 4/2021 | ......... G06Q 20/3825 |
| CN | 113268722 | A |   | 8/2021 | |
| WO | 2012048015 | A1 |  | 4/2012 | |

* cited by examiner

PERSONAL DIGITAL IDENTITY MANAGEMENT SYSTEM AND METHOD

CROSS REFERENCE TO RELATED APPLICATIONS

This application claims priority to Chinese Patent Application No. 202110535192.6 entitled "PERSONAL DIGITAL IDENTITY MANAGEMENT SYSTEM AND METHOD" filed on May 17, 2021, the entire content of which is incorporated herein by reference.

TECHNICAL FIELD

The present disclosure relates to the field of digital identity management and relates to a personal digital identity management system and method, and in particular to a method of actively providing multiple digital identities and preventing tracking and infringement on user privacy.

BACKGROUND

Password management is a very complex issue. When a large number of passwords need to be managed, it is very difficult to memorize all passwords and also difficult to generate a user name and a sufficiently secure password. On the other hand, the existing password management software cannot provide the capability of actively providing multiple digital identities and performing hierarchical management of the digital identities. Along with massive applications of big data technologies such as user portrait technology and the like, it is a usual thing for those internet giants to infringe on user privacy. Therefore, the users need a method of managing a digital identity and protecting privacy against infringement.

SUMMARY

The present disclosure provides a personal digital identity management system and method to help users perform management on digital identities, combat privacy infringement, and enable some cryptographic approaches to be available to the users.

Some embodiments of the present disclosure provide a personal digital identity management system which includes a client and a service end.

The client is capable of running independently and includes a cryptographically-secure random number generator, an information storage apparatus, a digital identity generator, a digital signature generating and verifying apparatus, a network communication apparatus, a hash calculator, a salt generator, and a display apparatus.

The client uses a user-specified keyword to perform hierarchical management on keys; a level-1 key is generated by the random number generator; a secondary key including a level-2 key is generated by an upper-level key and a salt through the hash calculator; for the level-2 key, the salt used in a key generation process includes but not limited to a random number, a keyword, and time information: the client uses a user-specified keyword to perform marking and grading on keys; the time information is used to enable the keys to be updated over time; the keywords in the salt used in a further secondary key generation process includes all keywords of the upper-level key and new keywords specified by the user this time; namely, the salt used in the further secondary key generation process includes a random number, all the keywords of the upper-level key, the keywords specified by the user this time, the time information or other known information.

A digital identity includes one master key for deriving the digital identity and additional information: the digital identity is generated by the digital identity generator and stored in the information storage apparatus.

The additional information of the digital identity includes a name, a public key, an additional signature, an index, and user-defined information, where the user-defined information includes an address, a name of each network platform, a corresponding account, a password and a private key of a digital currency and a payment receiving address; the public key in the additional information is obtained by using the master key as a private key through calculation, and the master key can serve as a private key to execute a cryptographic function; the additional information is generated by the digital identity generator.

The cryptographically-secure random number generator is configured to generate a random number with sufficient strength.

The information storage apparatus is configured to store all keys, salts, digital identities, and digital identity generation rules, and record a storage time.

The hash calculator is configured to, based on the upper-level key and the salt, generate a new lower-level key.

The digital signature generating and verifying apparatus is configured to use a private key corresponding to the digital identity to give a digital signature of the information and use a public key to verify the signature.

The network communication apparatus is inbuilt with a certificate used by the service end and configured to establish a trustable communication channel with the service end; the user is capable of sending the digital identity to the service end through the network communication apparatus.

In some optional embodiments, the digital identity generator is configured to generate a digital identity and user-desired account information. Firstly, the user sets the digital identity generation rule. The digital identity generation rule is a set of an additional information keyword and programmable scripts corresponding to the additional information keyword, and the scripts receive the additional information keyword and the digital identity master key and return the additional information corresponding to the keyword; the public key, the name, the additional signature, the serial number and the index in the additional information of the digital identity are not generated by the digital identity generation rule; the public key in the additional information of the digital identity is obtained by performing public key encryption algorithm with the master key as a private key; the name in the additional information of the digital identity is specified by the user and the default value is the keyword in the salt used for generating the master key; the additional signature in the additional information of the digital identity is specified by the user with the default value being null; the index is provided by the service end with the default value being null; the additional information keyword and the programmable scripts corresponding to the additional information keyword in the digital identity generation rule are preset based on user requirements.

Finally, the master key, the public key, the name, the additional signature, the serial number the index of the digital identity, and the digital identity generation rule used by the digital identity are stored in the information storage apparatus.

In some optional embodiments, the salt generator uses the user-specified upper-level key and keyword, the random number generated by the random number generator, the keyword in the salt used by the upper-level key, the user-specified keyword, and known information of a formatting time to generate a character string or a character string equivalent which is returned as salt and stored in the information storage apparatus.

The display apparatus is configured to display various levels of keys and the digital identities corresponding to the keys for selection by the user.

The service end accepts the digital identity information from the client performs a digital signature and further displays the information in public; the service end includes a communication module, a displaying module, and a signature management module; the communication module is configured to establish a secure channel with the client and communicate with the client; the signature management module includes paired public key and private key, and verifies the digital identity selected by a service end operator, and gives a verifiable digital signature; the displaying module performs serial-numbering and indexing on the digital identity transmitted by the client and display a serial number and an index in public.

In some optional embodiments, the present disclosure provides a personal digital identity management method based on the personal digital identity management system provided by the embodiments of the present disclosure. The method includes the following steps:

at step 1, initializing-creating keys, where initializing-creating the keys includes the following steps:

firstly, obtaining a level-1 key; where the level-1 key is generated by the client using the random number generator or directly specified by the user, and stored in the information storage apparatus; and, generating a secondary key by the client; where the user specifies an upper-level key and a keyword and uses the salt generator to generate a salt; the upper-level key and the salt are used to jointly generate the secondary key by using the hash calculator, and the secondary key is stored into the information storage apparatus;

at step 2, generating a digital identity, where generating the digital identity includes the following steps:

obtaining, by the client, the level-1 key or the secondary key as a master key of the digital identity from the information storage apparatus;

by using the digital identity generator of the client, generating a digital identity;

storing, by the client, the generated information into the information storage apparatus;

at step 3, using the digital identity, where using the digital identity includes the following steps:

quickly generating an account and a password, where quickly generating the account and the password includes the following steps:

firstly, selecting, by the user, a to-be-used digital identity through the display apparatus of the client while determining a digital identity generation rule for generating the digital identity;

inputting, by the user, platform information associated with the account; and, recognizing, by the client, the input information, and querying for a keyword in a digital identity additional information generation rule; when a corresponding platform keyword is obtained, using corresponding scripts to generate account information; when no corresponding platform keyword is obtained, defining, by the user, a new digital identity additional information generation rule or selecting an existing keyword and digital identity additional information generation rule and then using the corresponding scripts to generate the desired account information:

signing the information, wherein signing the information includes the following steps:

after the user inputs the information, selecting a to-be-used digital identity through the display apparatus of the client, using a master key of the user-selected digital identity as a private key, performing signature operation on the information by using the digital signature generating and verifying apparatus, and finally giving a corresponding digital signature; where the generated digital signature is taken as additional information of another digital identity:

transmitting the digital identity information to the service end, where transmitting the digital identity information to the service end includes the following steps:

requesting, by the client, the service end to receive the digital identity information; after the service end agrees, transmitting, by the client, the digital identity-related information to the service end by using the network communication apparatus; after receiving the digital identity information, examining, by the service end, a corresponding digital identity index by using the displaying module and displaying the digital identity information provided by the user and the digital identity index in public while returning the generated digital identity index to the client by using the communication module:

verifying the information, wherein verifying the information includes the following steps:

after obtaining the digital signature and the digital identity index given by other users, sending, by the user, the digital identity index to the service end by using the network communication apparatus of the client, and requesting the digital identity information of the counterparty including a public key;

returning, by the service end, the corresponding digital identity information by using the communication module based on the received digital identity index; and, performing, by the client, verification of the information based on the public key in the digital identity returned by the service end:

providing, by the service end, a signature for the digital identity, where providing, by the service end, the signature for the digital identity includes the following steps:

sending, by the user, the digital identity information to the service end by using the network communication apparatus of the client, and requesting the service end to require a service end maintainer to perform verification on the user identity; and, after performing verification on the user identity, using, by the service end maintainer, the signature management module of the service end to sign the digital identity sent by the user and give a digital signature corresponding to the user digital identity, and returning the digital identity information sent by the user, the digital signature given by the signature management module and the digital identity index to the client of the user:

verifying the digital identity, where verifying the digital identity includes the following steps:

in a scenario where identity verification and access control are required, providing, by the user of the client, to an access control party, a desired digital signature and a digital identity index of a signature issuer; and, requesting, by the access control party, from the service end, a digital identity corresponding to a digital identity index of the above signature issuer, and performing verification on the signature by using the public key returned by the service end; by confirming signature contents and authenticity, determining whether to allow access.

The beneficial effects of the present disclosure at least include the following technical effects.

In the present disclosure, available digital identities can be generated securely and quickly with an unlimited quantity, such that the user can switch between multiple digital identities so as to achieve the effect of combating the tracking for the digital identities and protecting the user privacy better. Furthermore, in a scenario where identity verification and access control are required, verification can be completed by providing a public key and signature.

BRIEF DESCRIPTIONS OF THE DRAWINGS

In order to more clearly describe the technical solutions of the present disclosure, the drawings required for descriptions of the embodiments of the present disclosure will be briefly introduced. It should be understood that the following drawings are merely some embodiments of the present disclosure, and thus they shall not be considered as limiting of the present disclosure. Those skilled in the art may also obtain other drawings based on these drawings without making creative work.

DETAILED DESCRIPTIONS OF EMBODIMENTS

Figure 1:
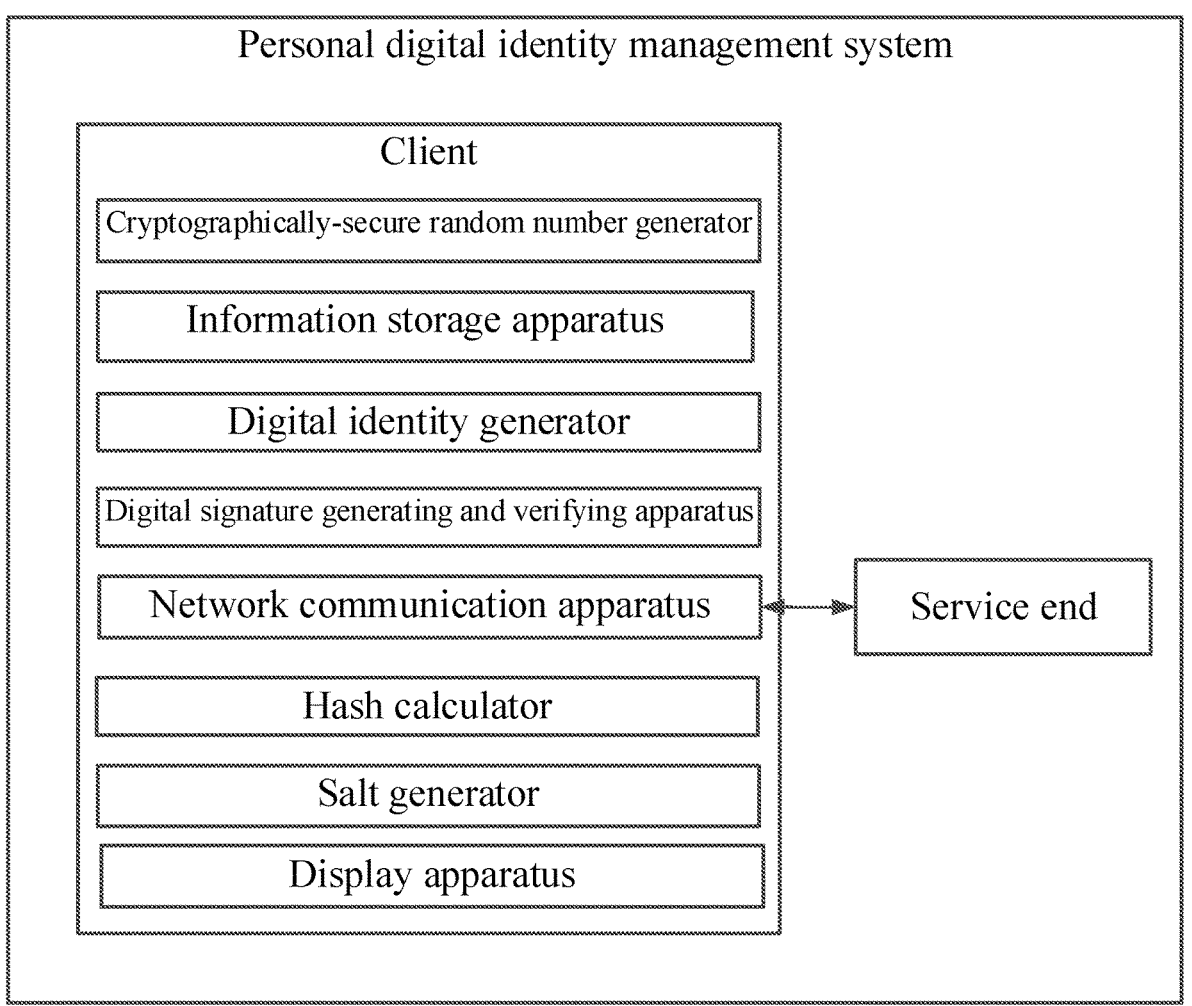
FIG. 1 is a personal digital identity management system according to an embodiment of the present disclosure.

In order to make the object, technical solutions and advantages of the embodiments of the present disclosure clearer, the technical solutions of the embodiments of the present disclosure will be fully and clearly described in combination with the drawings in the embodiments of the present disclosure. Apparently, the embodiments described herein are merely some embodiments of the present disclosure rather than all embodiments. Usually, the components of embodiments of the present disclosure described and shown in the drawings herein can be arranged and designed in different configurations.

Therefore, the descriptions of the embodiments of the present disclosure provided in the accompanying drawings are not intended to limit the scope of protection claimed, but merely illustrate some selected embodiments of the present disclosure. All other embodiments obtained by persons of ordinary skills in the art based on the embodiments of the present disclosure without making creative work shall fall within the scope of protection of the present disclosure.

It should be noted that similar numerals and letters represent similar items in the drawings. Therefore, once one item is defined in one drawing, it will not be further defined and explained in subsequent drawings.

It should be understood that the terms such as "include" and "have" and the like in the present disclosure are meant to indicate the presence of features, digits, steps, actions, components or combinations thereof disclosed in the present disclosure but do not preclude the possibility of presence or addition of one or more other features, digits, steps, actions, components or combinations thereof. The term "plural" in the present disclosure is usually interpreted as two or more.

The system and method of the present disclosure will be further set forth in combination with embodiments and drawings.

FIG. 1 is a personal digital identity management system according to an embodiment of the present disclosure. The personal digital identity management system may include a client and a service end.

The client is capable of running independently, and includes a cryptographically-secure random number generator, an information storage apparatus, a digital identity generator, a digital signature generating and verifying apparatus, a network communication apparatus, a hash calculator, a salt generator, and a display apparatus.

The client uses a user-specified keyword to perform hierarchical management on keys; a level-1 key is generated by the random number generator; a secondary key including a level-2 key is generated by an upper-level key and a salt through the hash calculator; for the level-2 key, the salt used in a key generation process includes a random number, a keyword, and time information: the client uses a user-specified keyword to perform marking and grading on keys; the time information is used to enable the keys to be updated over time; the keywords in the salt used in a further secondary key generation process include all keywords of the upper-level key and new keywords specified by the user this time; namely, the salt used in the further secondary key generation process includes a random number, the keywords of the upper-level key, the keywords specified by the user this time and the time information.

A digital identity includes one master key for deriving the digital identity and additional information: the digital identity is generated by the digital identity generator and stored in the information storage apparatus.

The additional information of the digital identity includes a name, a public key, an additional signature, an index, and user-defined information, where the user-defined information includes an address, a name of each network platform, a corresponding account, a password and a private key of a digital currency and a payment receiving address; the public key in the additional information is obtained by using the master key as a private key through calculation, and the master key can serve as a private key to execute a cryptographic function, for example, digital signature and encryption and decryption; the additional information is generated by the digital identity generator.

The cryptographically-secure random number generator is configured to generate a random number with sufficient strength.

The information storage apparatus is configured to store all keys, salts, digital identities, and digital identity generation rules, and record a storage time.

The hash calculator is configured to, based on the upper-level key and the salt, generate a new lower-level key.

The digital signature generating and verifying apparatus is configured to use a private key corresponding to the digital identity to give a digital signature of the information and use a public key to verify the signature.

The network communication apparatus is inbuilt with a certificate used by the service end and configured to establish a trustable communication channel with the service end; the user is capable of sending the digital identity to the service end through the network communication apparatus.

The digital identity generator is configured to generate a digital identity and user-desired account information; firstly, the user sets a digital identity generation rule: the digital identity generation rule is a set of an additional information keyword and programmable scripts corresponding to the additional information keyword, and the scripts receive the additional information keyword and the digital identity master key and return the additional information corresponding to the keyword; the public key, the name, the additional signature, the serial number and the index in the additional information of the digital identity are not generated by the digital identity generation rule; the public key in the additional information of the digital identity is obtained by performing public key encryption algorithm with the master key as a private key; the name in the additional information of the digital identity is specified by the user and the default value is the keyword in the salt used for generating the master key; the additional signature in the additional information of the digital identity is specified by the user with the default value being null; the serial number and the index is provided by the service end with the default value being null; the additional information keyword and the programmable scripts corresponding to the additional information keyword in the digital identity generation rule are preset based on user requirements.

Finally, the master key, the public key, the name, the additional signature, the serial number and the index of the digital identity, and the digital identity generation rule used by the digital identity are stored in the information storage apparatus.

The salt generator uses the upper-level key and keyword not limited to being specified by the user, the random number generated by the random number generator, the keyword in the salt used by the upper-level key, the user-specified keyword, and known information of a formatting time to generate a character string or a character string equivalent which is returned as salt and stored in the information storage apparatus.

The display apparatus is configured to display various levels of keys and corresponding digital identities for selection by the user.

The service end accepts the digital identity information from the client and performs digital signature and further displays the information in public; the service end includes a communication module, a displaying module, and a signature management module; the communication module is configured to establish a secure channel with the client and communicate with the client; the signature management module includes paired public key and private key, and verifies the digital identity selected by a service end operator, and gives a verifiable digital signature; the displaying module performs serial-numbering and indexing on the digital identity transmitted by the client and display a serial number and an index in public.

The user of the client may access the service end through World Wide Web to obtain digital identity information displayed by a specific user. For example, a user A of the client may, after receiving a signature of a digital identity B, perform verification by using the public key in the B displayed by the service end.

By using the salt and the level-1 key, the system of the present disclosure can generate an unlimited number of available digital identities quickly so as to prevent tracking for the digital identities; for the scenarios where verification and access control for user digital identity are required, a digital signature can be provided to facilitate verification of the digital identity.

Figure 2:
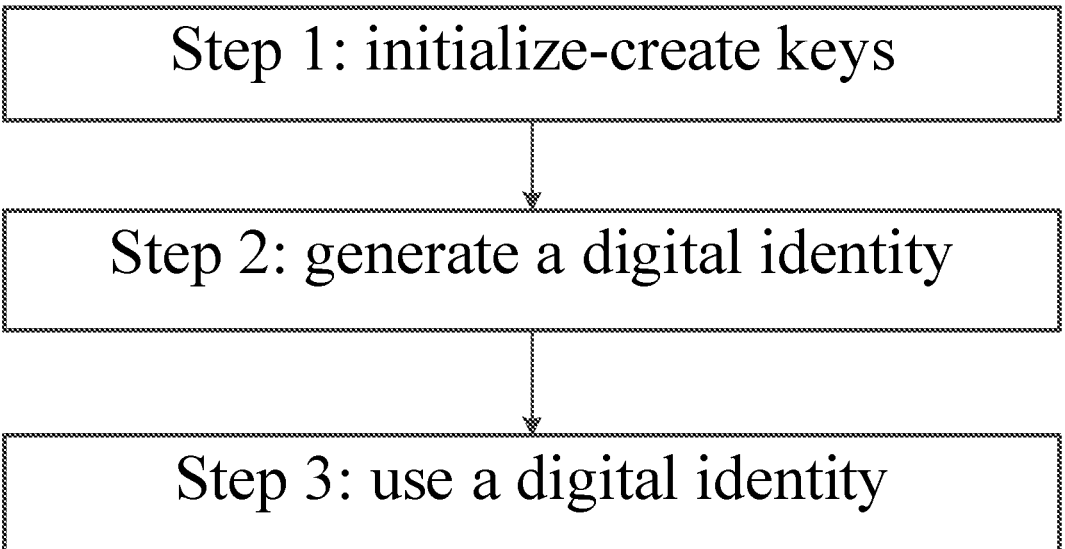
FIG. 2 is an exemplary embodiment of a personal digital identity management method implemented using a personal digital identity management system according to an embodiment of the present disclosure.

FIG. 2 is an exemplary embodiment of a personal digital identity management method implemented using the personal digital identity management system provided by the embodiments of the present disclosure. The personal digital identity management method may include the following steps.

At step 1, keys are initialized and created. Specifically, the steps of initializing and creating the keys may include the following steps:

1. Firstly, a level-1 key is obtained. The level-1 key is generated by the client using the random number generator or directly specified by the user, and stored in the information storage apparatus.

2. The client generates a secondary key. The user specifies an upper-level key and a keyword, and uses the salt generator to generate a salt. The upper-level key and the salt are used to jointly generate the secondary key by using the hash calculator and the secondary key is stored in the information storage apparatus.

At step 2, a digital identity is generated. Specifically, generating the digital identity includes the following steps:

1. The client obtains the level-1 key or the secondary key as a master key of the digital identity from the information storage apparatus.

2. by using the digital identity generator of the client, a digital identity is generated.

3. The client stores the generated information in the information storage apparatus.

At step 3, a digital identity is used.

Figure 3:
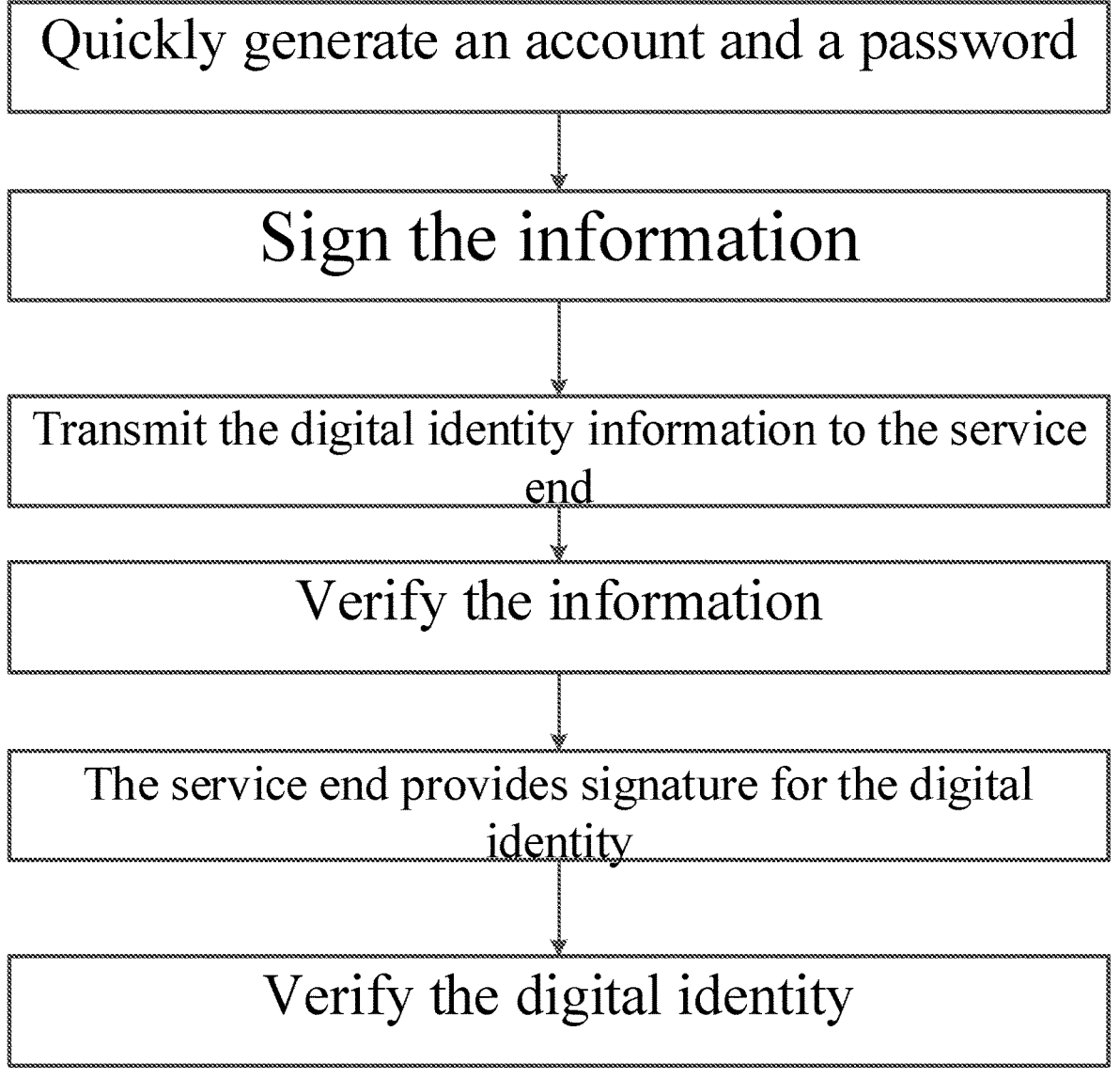
FIG. 3 shows specific steps of using a digital identity in a personal digital identity management method according to an embodiment of the present disclosure.

Specifically, with reference to FIG. 3, using the digital identity includes the following steps:

1. An account and a password are generated quickly.

(1) firstly, the user selects a to-be-used digital identity through the display apparatus of the client while determining a digital identity generation rule for generating the digital identity.

(2) The user inputs platform information associated with the account, such as a domain name of a website, a name of a platform, and the like. The input method includes but not limited to manual input and input by scanning.

(3) The client recognizes the input information, and queries for a keyword in a digital identity additional information generation rule. When a corresponding platform keyword is obtained, corresponding scripts are used to generate account information; when no corresponding platform keyword is obtained, the user defines a new digital identity additional information generation rule or selects an existing keyword and digital identity additional information generation rule and then uses the corresponding scripts to generate the desired account information.

2. The information is signed.

After the user inputs the information, the user selects a to-be-used digital identity through the display apparatus of the client, uses a master key of the user-selected digital identity as a private key, performs a signature operation on the information by using the digital signature generating, and verifying apparatus, and finally gives a corresponding digital signature; wherein the generated digital signature is taken as additional information of another digital identity. For example, after an employee gives a public key, the company may give a digital signature of the employment information of the employee. The employee may attach the signature to the additional information of the digital identity to prove the owner of the digital identity is the employee of the company.

3. The digital identity information is transmitted to the service end.

The client requests the service end to receive the digital identity information; after the service end agrees, the client transmits the digital identity-related information to the service end by using the network communication apparatus; after receiving the digital identity information, the service end examines a corresponding digital identity index by using the displaying module and displays the digital identity information provided by the user and the digital identity index in public while returning the generated digital identity index to the client by using the communication module.

4. Verification is performed on the information.

(1) After obtaining the digital signature and the digital identity index given by other users, the user sends the digital identity index to the service end by using the network communication apparatus of the client, and requests the digital identity information of the counterparty including a public key.

(2) The service end returns the corresponding digital identity information by using the communication module based on the received digital identity index.

(3) The client performs verification on the information based on the public key in the digital identity returned by the service end.

5. The service end provides a signature for the digital identity.

(1) The user sends the digital identity information to the service end by using the network communication apparatus of the client, and requests the service end to require a service end maintainer to perform verification on the user identity.

(2) After performing verification on the user identity, the service end maintainer uses the signature management module of the service end to sign the digital identity sent by the user and give a digital signature corresponding to the user digital identity, and returns the digital identity information sent by the user, the digital signature given by the signature management module and the digital identity index to the client of the user.

6. The digital identity is verified.

(1) In a scenario where identity verification and access control are required, the user of the client provides to an access control party, a desired digital signature and a digital identity index of a signature issuer.

(2) The access control party requests from the service end a digital identity corresponding to a digital identity index of the above signature issuer, and performs verification on the signature by using the public key returned by the service end; by confirming signature contents and authenticity, whether to allow access is determined.

INDUSTRIAL APPLICABILITY

The present disclosure provides a personal digital identity management system and method. The system includes a client and a service end. The client uses a user-specified keyword to perform hierarchical management on keys, and the service end accepts the digital identity information from the client and performs digital signature, and further displays the information in public. In the method of the present disclosure, available digital identities can be generated securely and quickly with an unlimited quantity, such that the user can perform switching between multiple digital identities so as to achieve the effect of combating the tracking for the digital identities and protecting the user privacy better. Furthermore, in a scenario where identity verification and access control are required, verification can be completed by providing a public key and signature.

It can be understood that the personal digital identity management system and method of the present disclosure can be reproduced and can be employed in multiple industrial applications. For example, the personal digital identity management system and method of the present disclosure can be used in the digital identity management field.

What is claimed is:

1. A method for managing a digital identity, executed by a first client device, comprising:

generating a plurality of digital identities for a user based on a plurality of keys, wherein each digital identity of the plurality of digital identities is generated based on a corresponding key among the plurality of keys, wherein generating the plurality of digital identities comprises, for each digital identity of the plurality of digital identities:

determining the corresponding key from the plurality of keys; and generating the digital identity based on the corresponding key, wherein the digital identity comprises identity information, the identity information comprising at least a public key, wherein the corresponding key serves as a private key paired with the public key, and wherein generating the digital identity based on the corresponding key comprises:

receiving an inputted first keyword, and invoking a first script which generates the identity information based on the inputted first keyword; and communicating with a server or a second client device by using a target digital identity to represent the user, wherein the target digital identity is capable of being switched among the plurality of digital identities.

2. The method according to claim 1, wherein the plurality of keys are grouped into at least two levels, wherein among the at least two levels, each key in a level other than a highest level is subordinate to a parent key in a directly previous level, and wherein the method further comprises:

for each key in the level other than the highest level among the at least two levels, generating said key based on the parent key and a salt; and for each key in the highest level, generating said key based on a random number.

3. The method according to claim 2, wherein the salt comprises another random number, one or more second keywords, and time information.

4. The method according to claim 3, wherein for each key in a level other than the highest level and a second highest level among the at least two levels, the salt further comprises each second keyword in the salt for generating the parent key.

5. The method according to claim 1, wherein the identity information further comprises at least one of:

a name of the digital identity, an additional signature, an index of the digital identity, a name of a platform, and one or both of an account and a password of the account for the platform.

6. The method according to claim 1, wherein generating the digital identity based on the corresponding key further comprises:

receiving information of a platform; and invoking the first script which generates the identity information based on the inputted first keyword, wherein invoking the first script comprises:

determining whether the first script comprises a second keyword representing the platform; and invoking the first script in response to the first script comprising the second keyword representing the platform.

7. The method according to claim 6, wherein generating the digital identity based on the corresponding key further comprises:

in response to the first script not comprising the second keyword representing the platform, invoking a second script which generates the identity information based on the inputted first keyword, wherein the second script comprises the second keyword representing the platform or is specified by the user.

8. The method according to claim 1, wherein determining the corresponding key from the plurality of keys comprises:

displaying the plurality of keys;

receiving an operation of the user for selecting the corresponding key; and determining the corresponding key according to the operation.

9. The method according to claim 1, wherein the method further comprises:

receiving a digital signature of the second client device; and adding the digital signature into the identity information, wherein the digital signature is generated by the second client device based on a private key of the second client device.

10. The method according to claim 1, wherein communicating with the server or the second client device by using the target digital identity to represent the user comprises:

transmitting the identity information of the target digital identity to the server, to enable the server to assign an index for the target digital identity; and receiving the index from the server.

11. The method according to claim 10, wherein the index is configured to enable the first client device or another client device to request at least the public key of the identity information of the target digital identity from the server.

12. The method according to claim 1, wherein communicating with the server or the second client device by using the target digital identity to represent the user comprises:

transmitting the identity information of the target digital identity to the server to enable the server to generate a digital signature for the target digital identity based on a private key of the server, wherein the digital signature is configured to prove that the server has verified the target digital identity.

13. The method according to claim 1, wherein communicating with the server or the second client device by using the target digital identity to represent the user comprises:

generating a digital signature by using the corresponding key of the target digital identity;

transmitting the digital signature to the second client device; and transmitting at least the identity information of the target digital identity to the server to enable the second client device to verify the digital signature by using the public key, which is requested by the second client device from the server.

14. The method according to claim 1, wherein communicating with the server or the second client device by using the target digital identity to represent the user comprises:

displaying the plurality of digital identities;

receiving an operation of the user for selecting a first digital identity from the plurality of digital identities; and determining the first digital identity to serve as the target digital identity.

15. The method according to claim 14, wherein communicating with the server or the second client device by using the target digital identity to represent the user comprises:

receiving another operation of the user for selecting a second digital identity when the first digital identity serves as the target digital identity; and determining the second digital identity to serve as the target digital identity.

16. An apparatus for managing a digital identity, comprising:

a memory storing computer-readable instructions; and a processor, wherein the computer-readable instructions, when executed by the processor, configure a first client device to:

generate a plurality of digital identities for a user based on a plurality of keys, wherein each digital identity of the plurality of digital identities is generated based on a corresponding key among the plurality of keys, wherein generating the plurality of digital identities comprises, for each digital identity of the plurality of digital identities:

determining the corresponding key from the plurality of keys; and generating the digital identity based on the corresponding key, wherein the digital identity comprises identity information, the identity information comprising at least a public key, wherein the corresponding key serves as a private key paired with the public key, and wherein generating the digital identity based on the corresponding key comprises:

receiving an inputted first keyword, and invoking a first script which generates the identity information based on the inputted first keyword; and communicate with a server or a second client device by using a target digital identity to represent the user, wherein the target digital identity is capable of being switched among the plurality of digital identities.

17. A non-transitory computer-readable storage medium comprising computer-readable instructions, wherein the computer-readable instructions, when executed by a processor, configure a first client device to:

generate a plurality of digital identities for a user based on a plurality of keys, wherein each digital identity of the plurality of digital identities is generated based on a corresponding key among the plurality of keys, wherein generating the plurality of digital identities comprises, for each digital identity of the plurality of digital identities:

determining the corresponding key from the plurality of keys; and generating a digital identity based on the corresponding key, wherein the digital identity comprises identity information, the identity information comprising at least a public key, wherein the corresponding key serves as a private key paired with the public key, and wherein generating the digital identity based on the corresponding key comprises:

receiving an inputted first keyword, and 5
invoking a first script which generates the identity information based on the inputted first keyword; and communicate with a server or a second client device by using a target digital identity to represent the user, 10 wherein the target digital identity is capable of being switched among the plurality of digital identities.

\* \* \* \* \*